(12) United States Patent
Foygel

(10) Patent No.: US 8,874,923 B2
(45) Date of Patent: Oct. 28, 2014

(54) POLICY-BASED SIGNATURE AUTHENTICATION SYSTEM AND METHOD

(75) Inventor: Dan Foygel, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/556,987

(22) Filed: Jul. 24, 2012

(65) Prior Publication Data

US 2014/0032914 A1 Jan. 30, 2014

(51) Int. Cl.
*H04L 9/32* (2006.01)

(52) U.S. Cl.
USPC ............. 713/176; 713/168; 705/75; 382/276; 382/308

(58) Field of Classification Search
None
See application file for complete search history.

(56) References Cited

U.S. PATENT DOCUMENTS

| 6,671,805 | B1* | 12/2003 | Brown et al. | 713/176 |
| 7,370,206 | B1* | 5/2008 | Goldman | 713/176 |
| 2002/0099938 | A1* | 7/2002 | Spitz | 713/155 |
| 2007/0043949 | A1* | 2/2007 | Bugbee | 713/176 |
| 2010/0313032 | A1* | 12/2010 | Oswalt | 713/176 |

\* cited by examiner

*Primary Examiner* — Fikremariam A Yalew
*Assistant Examiner* — Khoi Le
(74) *Attorney, Agent, or Firm* — Shook Hardy & Bacon LLP

(57) ABSTRACT

In various example embodiments, a system and method for providing policy-based authentication is provided. In example embodiments, a request to access and sign a document is received from a device of an intended signer. A policy assigned to the intended signer is determined. Based on the policy, a determination is made whether an authentication mechanism is applicable to the intended signer. In response to the determining that the authentication mechanism is applicable to the intended signer, the intended user is required to perform the authentication mechanism. The intended user is provided access to view and sign the document based on the intended user satisfying the authentication mechanism.

19 Claims, 6 Drawing Sheets

POLICY-BASED SIGNATURE AUTHENTICATION SYSTEM AND METHOD

FIELD

The present disclosure relates generally to digital signatures, and in a specific example embodiment, to policy-based signature authentication.

BACKGROUND

Conventionally, when a document, such as a contract, has to be signed by one or more parties to the document, the document may be mailed or e-mailed to the one or more parties. In the case of e-mail, a party may need to print out the document, sign the document, and fax or scan the signed document in order to send the signed document back to an appropriate party. More recently, parties may sign an electronic version of the document digitally.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing policy-based signature authentication. In various example embodiments, a system and method for providing policy-based authentication is provided. In example embodiments, a request to access and sign a document is received from a device of an intended signer. A policy assigned to the intended signer is determined. Based on the policy, a determination is made whether an authentication mechanism is applicable to the intended signer. In response to the determining that the authentication mechanism is applicable to the intended signer, the intended user is required to perform the authentication mechanism. The intended user is allowed to view and sign the document based on the intended user satisfying the authentication mechanism.

Figure 1:
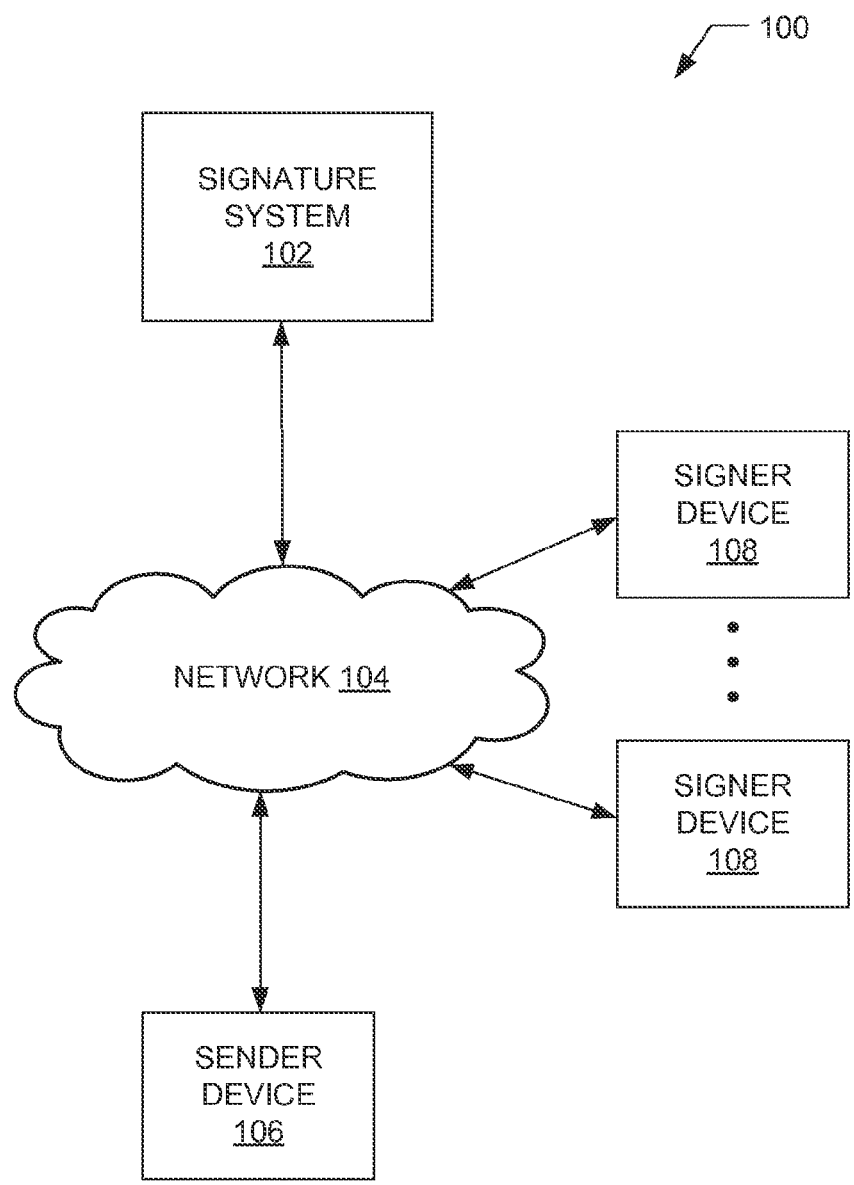
FIG. 1 is a block diagram illustrating an example embodiment of a network architecture of a system used to provide policy-based signature authentication.

With reference to FIG. 1, an example embodiment of a high-level client-server-based network architecture 100 in which embodiments of the present invention may be utilized is shown. A signature system 102 is coupled via a communication network 104 (e.g., the Internet, wireless network, cellular network, Local Area Network (LAN), or a Wide Area Network (WAN)) to a sender device 106 and one or more signer devices 108.

The signature system 102 manages the processing of digital signatures on electronic documents. In example embodiments, the signature system 102 is embodied on a server and allows a user at the sender device 106 or an administrator to established policies that each indicates an authentication mechanism for groups of intended signers of documents. The authentication mechanism specifies one or more actions that the intended signers are to perform in order to be authenticated with the signature system 102 so their signatures to be accepted. The policies may be established for a group of signers and saved as default policies that may be changeable by a user. The signature system 102 will be discussed in more detail in connection with FIG. 2 below.

The sender device 106 is associated with a user (referred to as the sender) that prepares a document for signature. In example embodiments, the signature system 102 provides a user interface to the sender through which the sender provides the document for signature, a list of one or more documents, and/or a list of one or more intended signers. In some cases, the sender may merely provide the list of intended signers, and the signature system 102 automatically determines a group that each intended signer is a member of and the associated authentication mechanism. In other cases, the sender may indicate an authentication policy to be associated each intended signer. In some embodiments, the sender may change or adjust a default authentication policy associated with an intended signer. In a specific case, the sender may also be a signer of the document.

The signer device 108 is associated with a user (referred to as the signer or intended signer) that is to sign the document. Based on the policy associated with the document, the signer authenticates themselves to the signature system prior to or substantially parallel with the signing of the document. If more than one signer is required to sign the document, different policies may apply to each of the signers as will be discussed in more detail below.

Each of the sender device 106 and the signer devices 108 may comprise a mobile phone, desktop computer, laptop, or any other communication device that a user may utilize to access the networked system 102 and enable signing of documents. In some embodiments, the sender device 106 and the signer devices 108 may comprise a display module (not shown) to display information (e.g., the document to be signed or a user interface to set up a signature process). In further embodiments, the sender device 106 and the signer devices 108 may comprise one or more of a touch screen, camera, and microphone. The sender device 106 and the signer device 108 are used by a user to view and interact with the documents to be signed as well as to authenticate themselves to the signature system 102.

Figure 2:
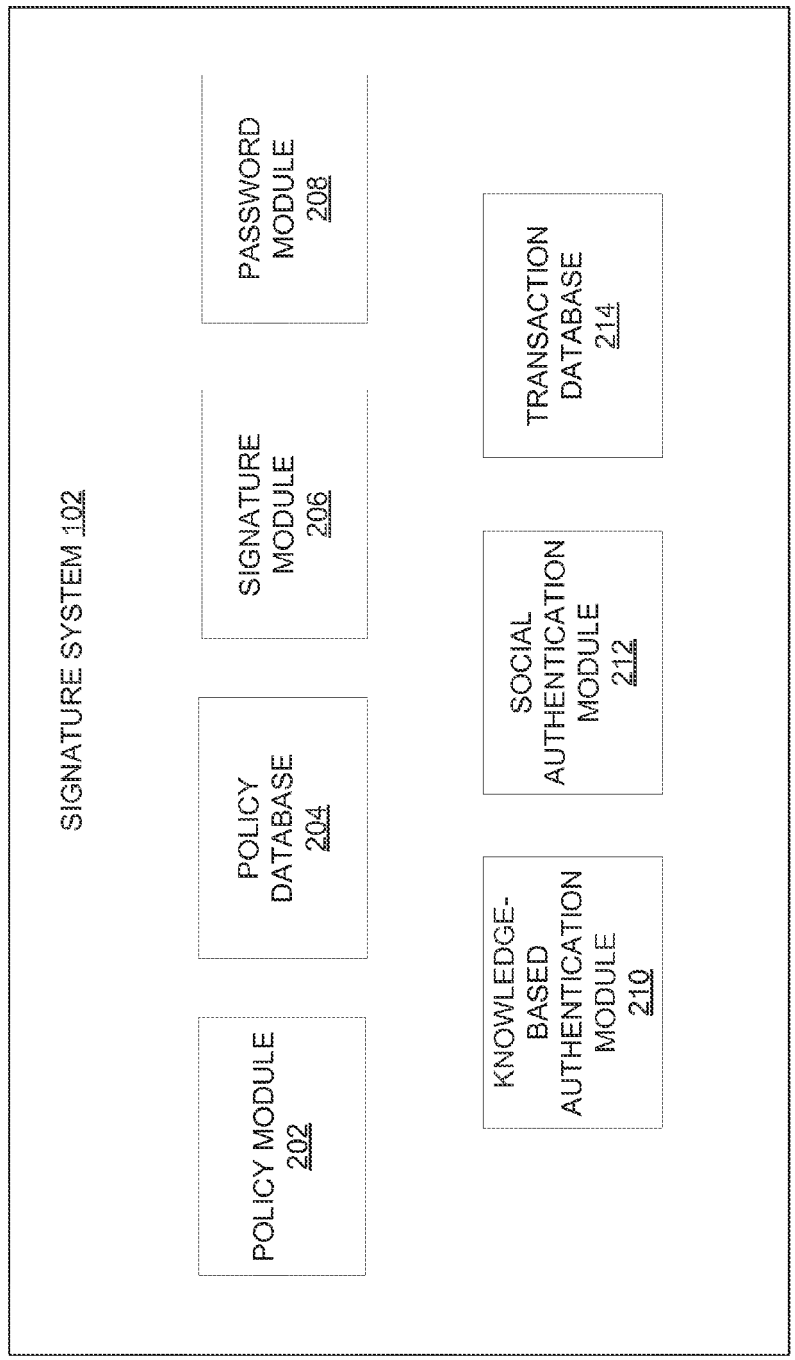
FIG. 2 is a block diagram illustrating an example embodiment of a signature system.

Referring now to FIG. 2, an example block diagram illustrating multiple components that, in one embodiment, are provided within the signature system 102 is shown. In example embodiments, the signature system 102 comprises a policy module 202, a policy database 204, a signature module 206, a password module 208, a knowledge-based authentication module 210, a social authentication module 212, and a transaction database 214. As shown in FIG. 2, some or all of the modules in the signature system 102 may be configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

The policy module 202 is configured to establish and apply authentication policies to be applied to intended signers of the documents. In example embodiments, the sender or an administrator associated with the sender may establish general policies for signature authentication. Each policy indicates one or more authentication mechanisms applicable to a group of signers (discussed in more detail below) that each signer of the group performs in order to authenticate themselves and their signature with the signature system 102. These policies are stored to the policy database 204.

The signature module 206 manages the signature process. In example embodiments, the signature module 206 provides a user interface to the sender through which the sender sets up a signature process. Accordingly, the sender may provide one or more documents (collectively referred to as a document) to be signed along with a list of one or more intended signers via the user interface. Alternatively, the sender may provide a list of the one or more documents and the signature module 206 may be enabled to retrieve or access the documents. The signature module 206 receives the document and the list of one or more intended signers and sends a communication (e.g., email) to each intended signer that may include a secure link to access the document to be signed.

When a document is made available for signature, a basic authentication may be associated with the document. In one embodiment, the basic authentication involves the signer clicking on the secure link within the email to access the document for signature. Because the secure link may be unique to the document and the signer, the selection for the secure link to access the document provides the basic authentication. Additionally or alternatively, the intended signer may be asked to log into their account established at the signature system 102 in order to access the document.

The policy module 202 or the signature module 206 may then determine, based on the policies associated with the document and the identity or affiliation of the intended signer, whether the intended signer has to perform any authentication mechanisms in order to access and sign the document. As such, the policy module 202 accesses the policy database 204 to determine a policy (e.g., for the group the intended signer is a member of) to apply to the intended signer. The policy may identify zero or more authentication mechanisms that the intended signer needs to perform in order to be authenticated with the signature system 102.

Several authentication mechanisms may be available to the signature system 102. One authentication mechanism is a password-based authentication mechanism. With the password-based authentication mechanism, a sender selects a password or PIN code (collectively referred to as a password) that a signer needs to provide to the signature system 102. The sender-selected password is stored at the signature system 102 by the password module 208. In one embodiment, the sender may use out-of-band communication (e.g., call the signer) to provide the password to the intended signer. However, any type of communication may be utilized to communicate the password to the intended signer. When the intended signer attempts to access and sign a document, the password module 208 will request the intended signer to enter the password (e.g., in a field on a user interface provided by the signature module 206). The password module 208 verifies the entered password with the previously-stored password received from the sender. If verified, the intended signer is allowed to proceed with viewing and signing the document.

Another authentication mechanism is a knowledge-based authentication mechanism. In example embodiments, the knowledge-based authentication module 210 may transfer the intended signer to a third party that authenticates the intended signer by asking the intended signer one or more public or proprietary database identity questions. For example, the intended signer may be asked which of a number of streets did the signer live on, what the signer's mortgage amount is, or what address the signer previously lived at. The signer provides an answer to each presented question, and the third party matches each answer against a database of public or proprietary identity information. In response to correctly answering the one or more questions, the third party notifies the signature system 102 (e.g., the knowledge-based authentication module 210), and the knowledge-based authentication module 210 records the authenticated information about the signer (e.g., their name) and a statement from the third party that the third party verified the signer. The signer is then allowed to access and sign the document.

A further authentication mechanism is a web identity authentication mechanism. With the web identity authentication mechanism, the intended signer is requested, by the social authentication module 212, to sign in with a social network (e.g., Linked In, Facebook, Twitter). In some embodiments, the intended user may be transferred to a particular social network by the social authentication module 212. Once the intended signer signs in with the social network, the intended signer may be sent back to the signature system 102 and allowed to view and sign the document. In example embodiments, the social network allows the signature system 102 to integrate with the social network database of users. Thus, the social authentication module 212 may access or receive information regarding the identity of the signer from the social network (e.g., a URL of profile, picture, e-mail address). The signature from the signer is then associated with the signer's social identity by the social authentication module 212. As such, the signer may prove their identity based on their social graph. The web identity authentication mechanism is reliable since a user profile is difficult to forge. While a user can copy information about an intended signer, it is difficult to create all the associations with other individuals (e.g., the signer's social graph).

In example embodiments, the policy module 202 or signature module 206 allows the sender to choose a way to authenticate the intended signer from a catalog of options (e.g., require application of authentication mechanism based on signer's group policy or not require any authentication mechanism). Furthermore, the sender is allowed to apply different policies in different situations. For example, signers that are within the same organization as the sender (e.g., same organization group) may not be required to perform any authentication mechanisms, while a signer that is outside of the sender's organization (e.g., outside organization group) may be asked to perform one or more authentication mechanisms based on the associated group policy.

With respect to signers outside of the organization, different policies may also be established and applied. For example, signers who have done business with the sender (or the sender's organization) before may have an established e-mail address in the transaction database 214 which can be matched to that of the signer when the signer accesses a current document to be signed via a link in an e-mail addressed to the signer. As such, these (repeat) signers may have a group policy for repeat signers applied, which indicates that the sign does not need to perform an authentication mechanism in order to authenticate themselves to the signature system 102 again. Alternatively, the repeat signers may be requested to perform a single authentication mechanism as opposed to more than one authentication mechanism.

As such, different policies may be established for different groups of individuals (e.g., groups within/outside the organization, groups of people you have done business with, groups of people at partner organizations). The policies may then be applied to different parties to a contract or document based on each party's associated group. The policies may be set up on a global basis or on an individual basis. In one embodiment, the policies may be established and stored within, or associated with, the preferences of the sender. In a specific case, the sender can set (or reset) the policy when the sender sends out the document. In some embodiments, an administrator may set default policies for multiple groups of users, but allow senders to modify the policies. In one embodiment, the sender may only be allowed to change the policy to make the policy stricter (e.g., requiring an additional authentication mechanism). The policies are stored to the policy database 204 by the policy module 202 and associated with the sender or organization of the sender.

Different parties to the same document may have different policies applied to them. For example, a contract may require the signature of a customer and a manager of a partner organization. The customer may be required to perform an authentication mechanism based on a customer group policy. However the manager at the partner organization, while still outside of the sender's organization, may have an umbrella of trust that is extended to them due to a partner group policy. As such, the manager may not need to perform any authentication mechanisms.

Additionally, a group may be divided into sub-groups. For example, customers that the sender has not worked with before may be assigned one policy, while customers that the sender has worked with before may be assigned a different policy. As a result, the customers that the sender has not worked with before may be required to perform at least one more authentication mechanism than the customers that the sender has worked with before.

In one embodiment, a rule-based system may be used to determine whether an authentication mechanism is applicable to a signer. In a rule-based system, each signer is associated with a condition (e.g., if this type of signer, then require that kind of authentication mechanism).

In example embodiments, an escalation path may be applied by the policy module 202. For example, if the intended signer fails to properly authenticate, the policy module 202 may require the intended signer to authenticate using one or more different authentication mechanisms.

Once the signer has satisfied any authentication mechanism that applies to them based on the associated policy, the signer is provided access to view and sign the document by the signature module 206. In example embodiments, the identification of the signer, the document, any authentication mechanism applied, or any other attributes associated with the signature process may be recorded to the transaction database 214. Thus, an audit trail for each signer and document is maintained in the transaction database 214. In example embodiments, the audit trail may be accessible to one of more parties to the document or contract.

Although the various components of the signature system 102 have been defined in terms of a variety of individual modules, a skilled artisan will recognize that many of the items can be combined or organized in other ways and that not all modules need to be present or implemented in accordance with example embodiments. Furthermore, not all components of the signature system 102 may have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 3:
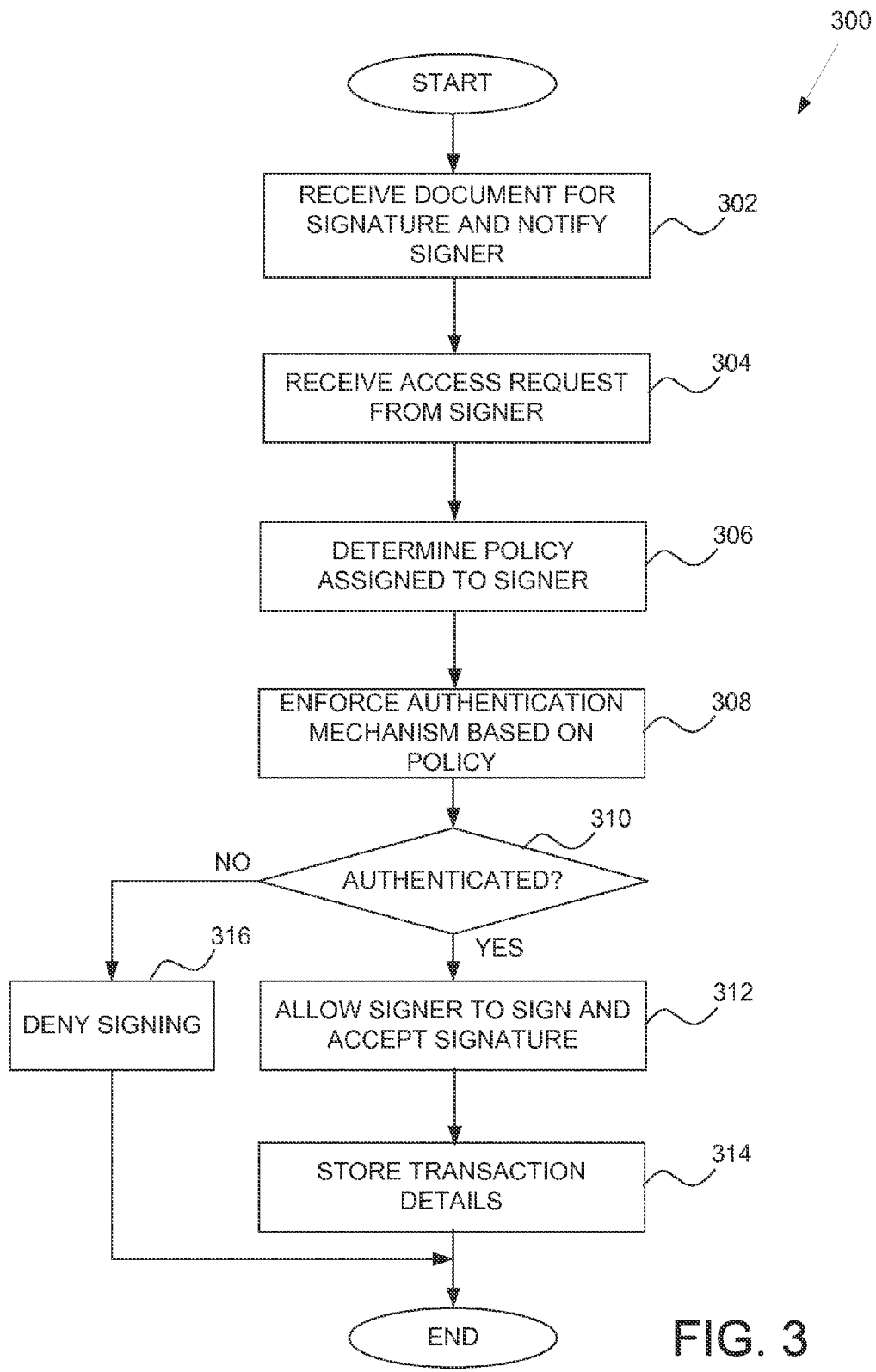
FIG. 3 is a flow diagram of an example high-level method for enabling digital signatures on a document.

FIG. 3 is a flow diagram of an example high-level method 300 for enabling digital signatures on a document. In operation 302, the signature module 206 receives the document for signature. Along with the document, a list of one or more intended signers is also received from the sender. The list may include contact information for the intended signers (e.g., e-mail address). In example embodiments, the signature module 206 provides a user interface to a sender through which the sender provides the document and the list of intended signers. The list may include contact information for each intended signer (e.g., if the intended signer is not already known to the signature system 102). The signature module 206 then sends a communication (e.g., email) to each intended signer that may include a secure link to access the document to be signed. Additionally or alternatively, the intended signer may be requested to sign into the signature system 102.

A request from the intended signer is received by the signature module 206 in operation 304. For example, the intended signer may click on the secure link in the communication received from the signature module 206. The selected secure link will trigger a request to the signature module 206 for access to sign the document.

In operation 306, a policy assigned to the intended signer is determined. In example embodiments, the request includes an identifier of the intended signer. The identifier may specifically identify the intended signer (e.g., name of the signer) as well as generically identify the intended signer by indicating a group with which the intended signer is associated (e.g., organization group members, partner group members, group of customers with past transactions). Using the identifier, the policy module 202 (or signature module 206) accesses the policy database 204 to determine a policy to apply to the intended signer.

In operation 308, the authentication mechanism indicated by the associated policy is enforced. Based on the policy associated with the document and the identity or group affiliation of the intended signer, the authentication mechanism is identified. In some embodiment, no authentication mechanism is needed (e.g., a signer within the same organization as the sender). Alternatively, one or more authentication mechanisms may be required to be performed by the intended signer. In example embodiments, the authentication module causes a user interface indicating a request to perform the authentication mechanism to be presented to the intended signer.

A determination as to whether the intended signer is authenticated is performed in operation 310. In example embodiments, if the intended signer correctly performs the authentication mechanism that is indicated in the policy assigned to the intended signer, the intended signer is authenticated to the signature system 102. As such, the intended signer is allowed to sign the document and the signature is accepted in operation 312. The transaction details may then be stored in operation 314. The transaction details may include a time the document was signed, the authentication mechanism that was performed (if any), and proof of the performance of the authentication mechanism.

However, if the intended signer is not authenticated in operation 310, the intended signer may be denied access to sign the document in operation 316. In some embodiments, after a configurable number of authentication failures, the signer may be temporarily locked out of attempting to sign the document or they may be permanently blocked from signing that document. In an alternative embodiment, the policy module 204 may require the intended signer to authenticate using one or more different authentication mechanisms. For example, if the intended signer cannot or does not sign into asocial network, the policy module 204 may require the intended signer to perform a knowledge-based authentication.

It is noted that while example embodiments are described as allowing the intended signer to digitally sign the document, alternatively, the intended signer may be allowed to access and physically sign the document. For example, once the intended signer is authenticated in operation 310, the intended signer is allowed to download, print, sign, and fax (or scan and e-mail) back the signed document in operation 312.

Figure 4:
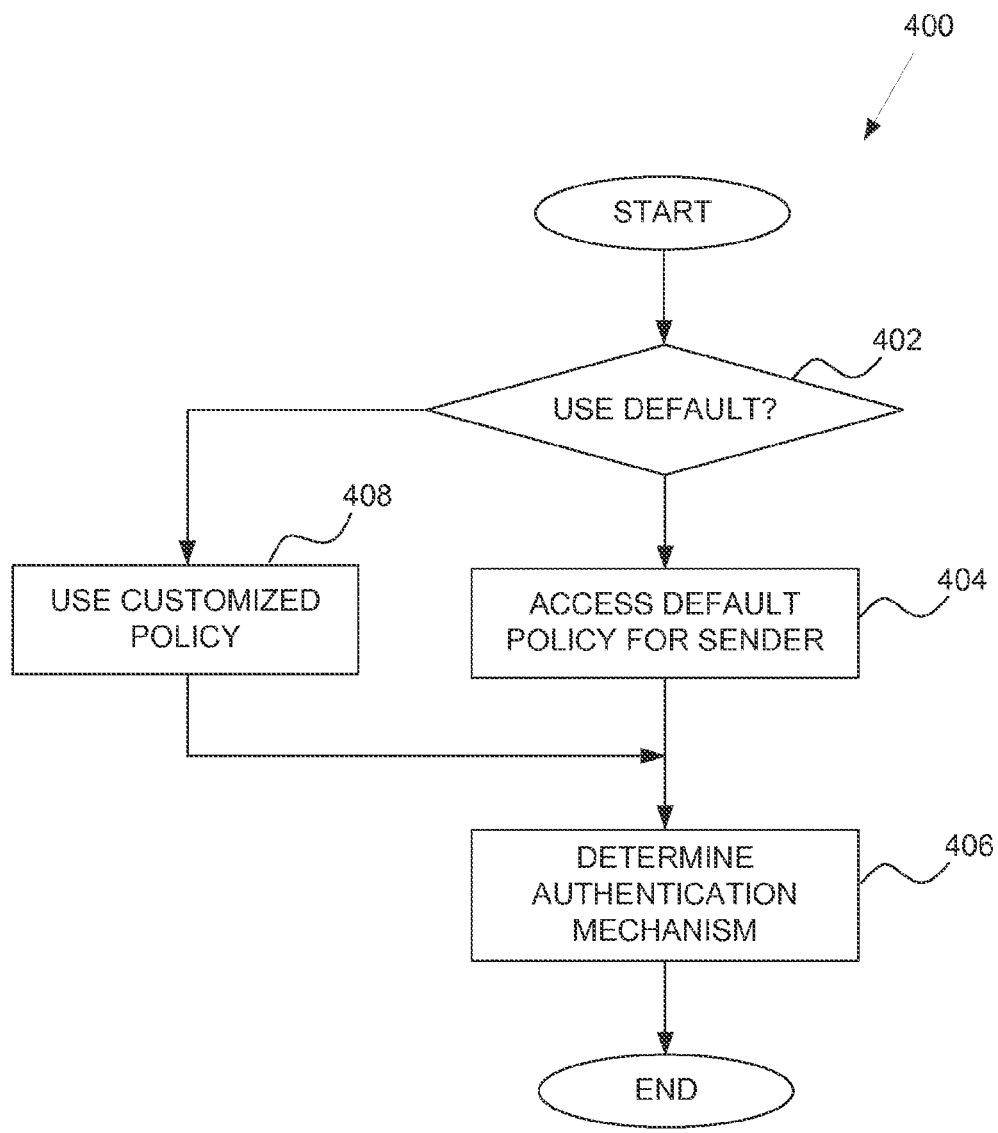
FIG. 4 is a flow diagram of an example high-level method for determining an authentication mechanism.

FIG. 4 is a flow diagram of an example high-level method 400 for determining an authentication mechanism to apply to an intended signer. In example embodiments, a default policy is applied to the intended signer unless the sender customizes a policy to apply to the intended signer. As such, in operation 402, a determination as to whether a default policy should be used is determined. For example, if the sender provides the document to the signature system 102 without any instructions or modifications, then the signature system 102 may apply the default policy that is associated with the group the intended signer is a part of.

For a default policy, the policy module 202 accesses the policy that is normally assigned to a group to which the intended signer belongs in operation 404. The authentication mechanism is determined in operation 406 based on the default policy.

If a default policy is not to be used as determined in operation 402, then a customized policy in operation 408 is used. In one embodiment, the customized policy may be supplied by the sender using the user interface provided by the signature system 102. For example, the sender may provide the customized policy along with the document and list of signers. In one case, the sender may indicate that a new employee at a partner organization be required to use a password authentication (e.g., when a default policy provides no authentication mechanism is required for members of a partner organization). The authentication mechanism is then determined in operation 406 based on the customized policy.

Figure 5:
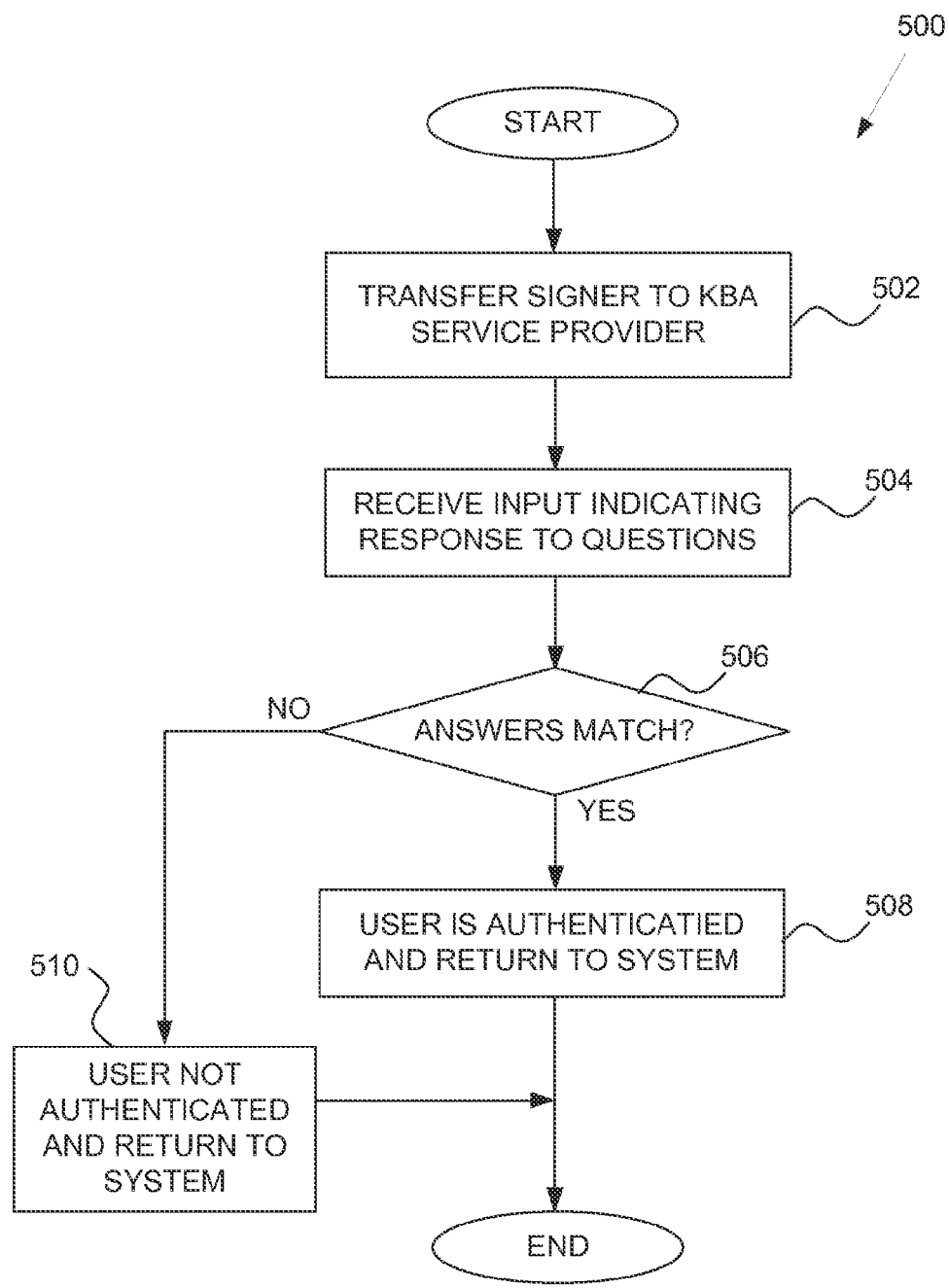
FIG. 5 is a flow diagram of an example method for providing knowledge-based authentication.

FIG. 5 is a flow diagram of an example method 500 for providing knowledge-based authentication in the signature system 102. If the intended signer is required to perform knowledge-based authentication, the knowledge-based authentication module 210 transfers the intended signer to a knowledge-based authentication service provider in operation 502.

In operation 504, inputs indicating responses to questions presented by knowledge-based authentication service provider are received from the intended signer. The questions are based on information found in one or more public or proprietary databases of which, presumably, only the intended signer may has knowledge. For example, the intended signer may be asked which of a number of streets did the intended signer live on, which of a list of people does the intended signer know, or what address the intended signer previously lived at. The signer provides an answer to each presented question.

If the answers match the information from the one or more public or proprietary databases in operation 506, the user is authenticated and returned to the signature system 102 in operation 508. In example embodiments, the knowledge-based authentication service provider notifies the signature system 102 regarding the authentication of the intended signer, and the knowledge-based authentication module 210 records the authenticated information about the intended signer (e.g., their name) and a statement from the knowledge-based authentication service provider that the knowledge-based authentication service provider verified the intended signer. The intended signer is then allowed to access and sign the document.

However, if one or more of the answers do not match the information from the one or more public or proprietary databases in operation 506, the intended signer is not authenticated and returned to the signature system 102 in operation 510. In this case, the knowledge-based authentication service provider notifies the signature system 102 regarding the non-authentication of the intended signer, and the knowledge-based authentication module 210 records the authenticated information about the signer (e.g, their name) and a statement from the knowledge-based authentication service provider regarding the non-authentication. Furthermore, the signature system 102 may not allow the intended signer to access and sign the document or may require the intended signer to perform a different authentication mechanism.

Figure 6:
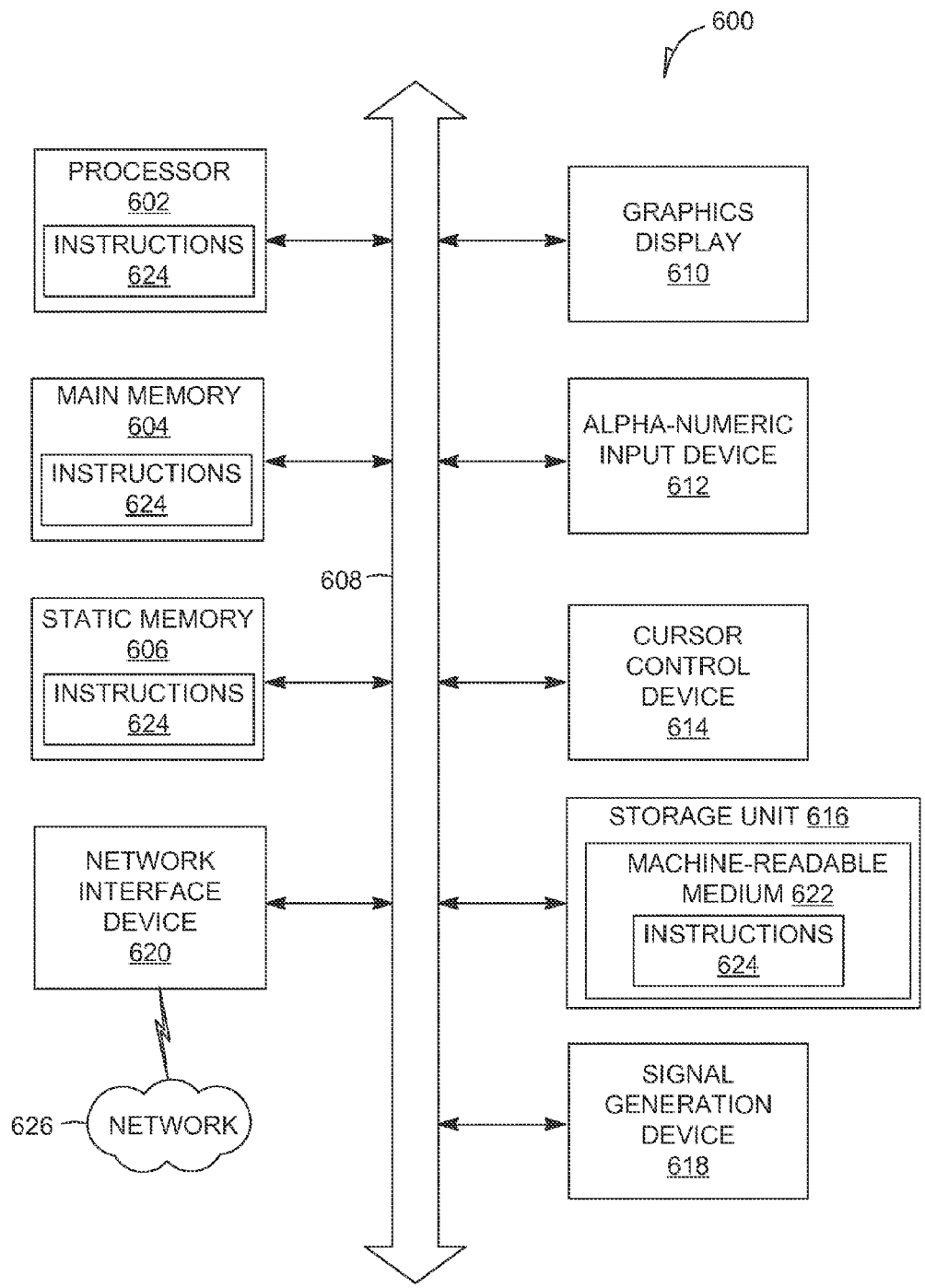
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., Wifi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, from a device of an intended signer, a request to access and sign a document;
   determining a policy assigned to the intended signer, wherein the determining of the policy comprises:
      determining a group to which the intended signer belongs, wherein a group to which a signer belongs is determined by the organization the intended signer is affiliated with, and
      determining the policy assigned to the group;
   determining whether an authentication mechanism is applicable to the intended signer based on the policy assigned to the intended signer, wherein an authentication mechanism specifies an action that the intended signer performs in order to be authenticated such that a signature of the intended signer is accepted;
   in response to determining that the authentication mechanism is applicable to the intended signer, determining a respective authentication mechanisms from a plurality of authentication mechanism and causing a user interface indicating a request to perform the respective authentication mechanism to be presented to the intended signer; and
   providing access to view and sign the document based on the intended signer satisfying the respective authentication mechanism.

2. The method of claim 1, wherein the determining of the policy comprises determining a customized policy that is specific to the intended signer, the customized policy customized by a sender of the document.

3. The method of claim 1, further comprising:
   causing a user interface to be presented to a sender of the document;
   receiving, via the user interface, a list of one or more documents and a list of one or more intended signers including the intended signer; and
   sending a communication including a link to the intended signer.

4. The method of claim 1, further comprising:
   causing a user interface to be presented to a user associated with the sender; and
   receiving policy attributes to create one or more group policies that specify whether an authentication mechanism is applicable to a group of intended signers.

5. The method of claim 1, wherein the authentication mechanism indicated by the policy comprises an authentication mechanism based on the knowledge of the intended signer.

6. The method of claim 5, further comprising recording a statement from a third party indicating whether the intended signer is authenticated by the third party by answering one or more public or proprietary database identity questions.

7. The method of claim 1, wherein the authentication mechanism indicated by the policy comprises a web identity authentication mechanism performed via a social network.

8. The method of claim 1, wherein the authentication mechanism indicated by the policy comprises a password authentication mechanism using a password that is provided to the signer via an out-of-band communication.

9. The method of claim 1, further comprising requiring the intended signer to perform a different authentication mechanism based on the intended user failing to satisfy the authentication mechanism indicated by the policy.

10. The method of claim 1, further comprising storing transaction details for the document signed by the intended signer, the transaction details including information regarding the authentication mechanism performed by the intended signer.

11. A machine-readable storage medium in communication with at least one processor, the machine-readable storage medium storing instructions which, when executed by the at least one processor of a machine, cause the machine to perform operations comprising:

receiving, from a device of an intended signer, a request to access and sign a document;

determining a policy assigned to the intended signer, wherein the determining of the policy comprises:

determining a group to which the intended signer belongs, wherein a group to which a signer belongs is determined by the organization the intended signer is affiliated with, and determining the policy assigned to the group;

determining whether an authentication mechanism is applicable to the intended signer based on the policy assigned to the intended signer, wherein an authentication mechanism specifies an action that the intended signer performs in order to be authenticated such that a signature of the intended signer is accepted;

in response to determining that the authentication mechanism is applicable to the intended signer, determining a respective authentication mechanism from a plurality of authentication mechanisms and causing a user interface indicating a request to perform the respective authentication mechanism to be presented to the intended signer; and providing access to view and sign the document based on the intended signer satisfying the respective authentication mechanism.

12. The machine-readable storage medium of claim 11, wherein the operations further comprise:

causing a user interface to be presented to a sender of the document;

receiving, via the user interface, a list of one or more documents and a list of one or more intended signers including the intended signer; and sending a communication including a link to the intended signer.

13. The machine-readable storage medium of claim 11, wherein the operations further comprise:

causing a user interface to be presented to a user associated with the sender; and receiving policy attributes to create one or more group policies that specify whether an authentication mechanism is applicable to a group of intended signers.

14. The machine-readable storage medium of claim 11, wherein the authentication mechanism indicated by the policy comprises a selection from the group consisting of a knowledge-based authentication mechanism, a web identity authentication mechanism performed via a social network, and a password authentication mechanism using a password that is provided to the signer via an out-of-band communication.

15. The machine-readable storage medium of claim 11, wherein the operations further comprise requiring the intended signer to perform a different authentication mechanism based on the intended user failing to satisfy the authentication mechanism indicated by the policy.

16. A system comprising:

at least one processor of a machine;

a signature module to receive, from a device of an intended signer, a request to access and sign a document;

a policy module to determine a policy assigned to the intended signer and to determine whether an authentication mechanism is applicable to the intended signer based on the policy assigned to the intended signer, wherein a policy module determines the policy comprises: determines a group to which the intended signer belongs, wherein a group to which a signer belongs is determined by the organization the intended signer is affiliated with, and determines the policy assigned to the group, wherein an authentication mechanism specifies an action that the intended signer performs in order to be authenticated such that a signature of the intended signer is accepted; and an authentication module to determine a respective authentication mechanism from a plurality of an authentication mechanisms and cause a user interface indicating a request to perform the respective authentication mechanism to be presented to the intended signer in response to determining that the authentication mechanism is applicable to the intended signer, the signature module to provide access to view and sign the document based on the intended user satisfying the respective authentication mechanism.

17. The system of claim 16, wherein the authentication module comprises a selection of the group consisting of a knowledge-based authentication module, a social authentication module, and a password module.

18. The system of claim 16, further comprising a transaction database for storing transaction details for the document signed by the intended signer, the transaction details including information regarding the authentication mechanism performed by the intended signer.

19. The method of claim 1, wherein the level of authentication indicates zero or more authentication mechanisms that the intended signer performs in order to be authenticated.

* * * * *